US008972222B2

(12) United States Patent
Kumagae

(10) Patent No.: US 8,972,222 B2
(45) Date of Patent: Mar. 3, 2015

(54) SYSTEM FOR IDENTIFYING CAUSE OF ABNORMALITY, METHOD OF IDENTIFYING CAUSE OF ABNORMALITY, AND PROGRAM FOR IDENTIFYING CAUSE OF ABNORMALITY

(71) Applicant: Prefeed Corporation, Tokyo (JP)

(72) Inventor: Yoshio Kumagae, Tokyo (JP)

(73) Assignee: Prefeed Corporation, Tokyo (JP)

( * ) Notice: Subject to any disclaimer, the term of this patent is extended or adjusted under 35 U.S.C. 154(b) by 0 days.

(21) Appl. No.: 14/276,353

(22) Filed: May 13, 2014

(65) Prior Publication Data

US 2014/0358481 A1    Dec. 4, 2014

(30) Foreign Application Priority Data

Jun. 4, 2013 (JP) .................................. 2013-118165

(51) Int. Cl.
| | | |
|---|---|---|
| *G06F 11/30* | (2006.01) | |
| *G05B 23/02* | (2006.01) | |
| *G06F 19/00* | (2011.01) | |

(52) U.S. Cl.
CPC .................................. *G05B 23/0275* (2013.01)
USPC ............... 702/185; 702/81; 702/82; 702/186; 702/187; 702/188

(58) Field of Classification Search
CPC .............. G06F 11/079; G06F 11/0766; G05B 23/0275

USPC ....................................... 702/81, 82, 185–188
See application file for complete search history.

(56) References Cited

U.S. PATENT DOCUMENTS

2006/0288261 A1* 12/2006 Yuan et al. ...................... 714/48
2010/0241399 A1*  9/2010 Kavaklioglu ................. 702/179

FOREIGN PATENT DOCUMENTS

JP           A-3-53123           3/1991

\* cited by examiner

*Primary Examiner* — Phuong Huynh
(74) *Attorney, Agent, or Firm* — Oliff PLC

(57) ABSTRACT

A system includes a measured value storing device in which a product measured value acquired periodically and a manufacturing condition measured value are stored, a product threshold value setting device that sets a product threshold value for determining whether a product is normal or not, an abnormality accumulating device that acquires a product abnormality cumulative frequency where the product abnormality measured value exceeds the product threshold value, a product threshold value changing device that changes the product threshold value, a condition threshold value setting device that sets a condition threshold value to be compared with a manufacturing condition measured value, a condition abnormality accumulating device that acquires a condition cumulative frequency, a condition threshold value changing device that changes a condition threshold value, and a cause identifying device that identifies a cause of abnormality based on the distribution of the product abnormality cumulative frequency and a manufacturing condition cumulative frequency.

15 Claims, 19 Drawing Sheets

THRESHOLD VALUE 12 IS EXCESSIVELY LARGE

COLOR > 12

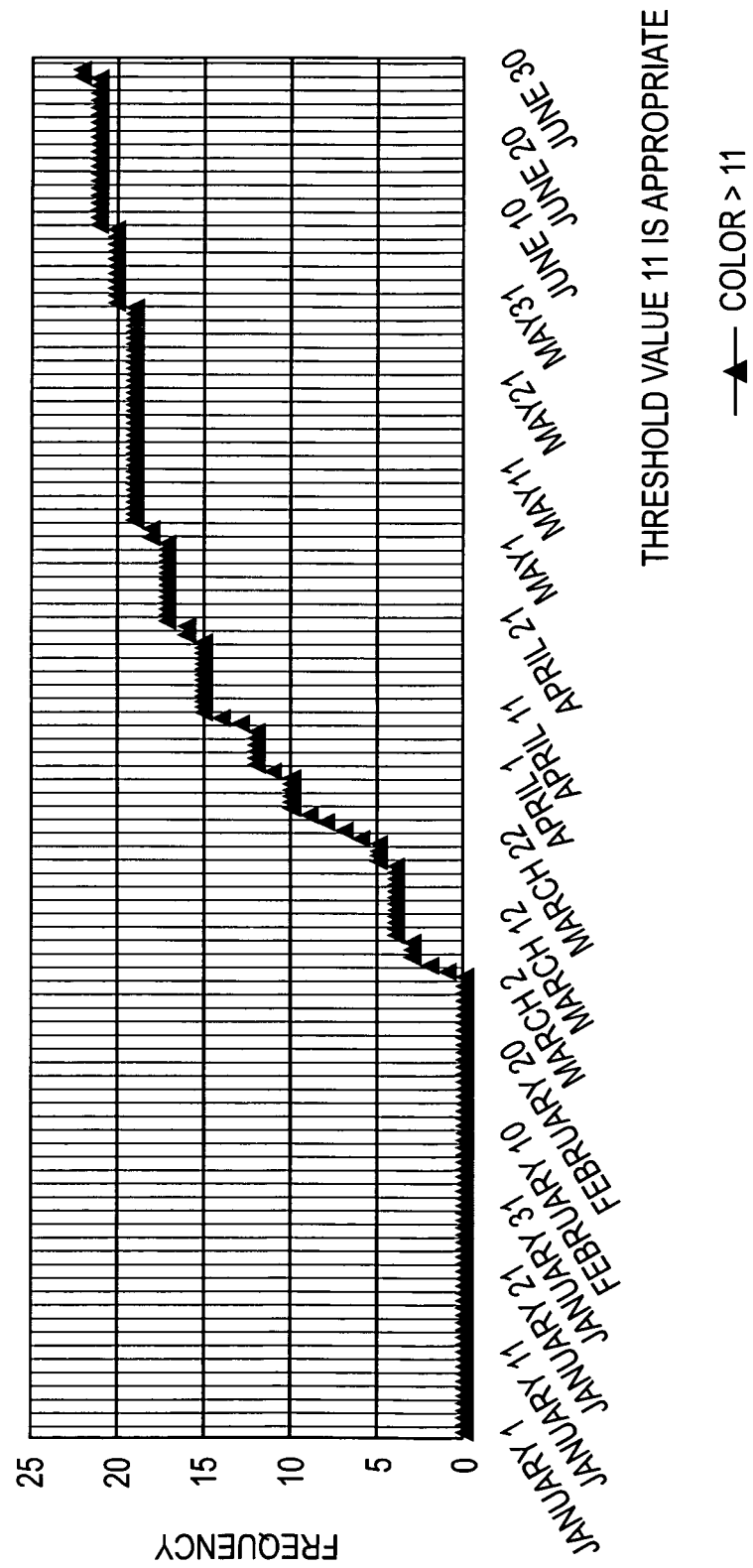

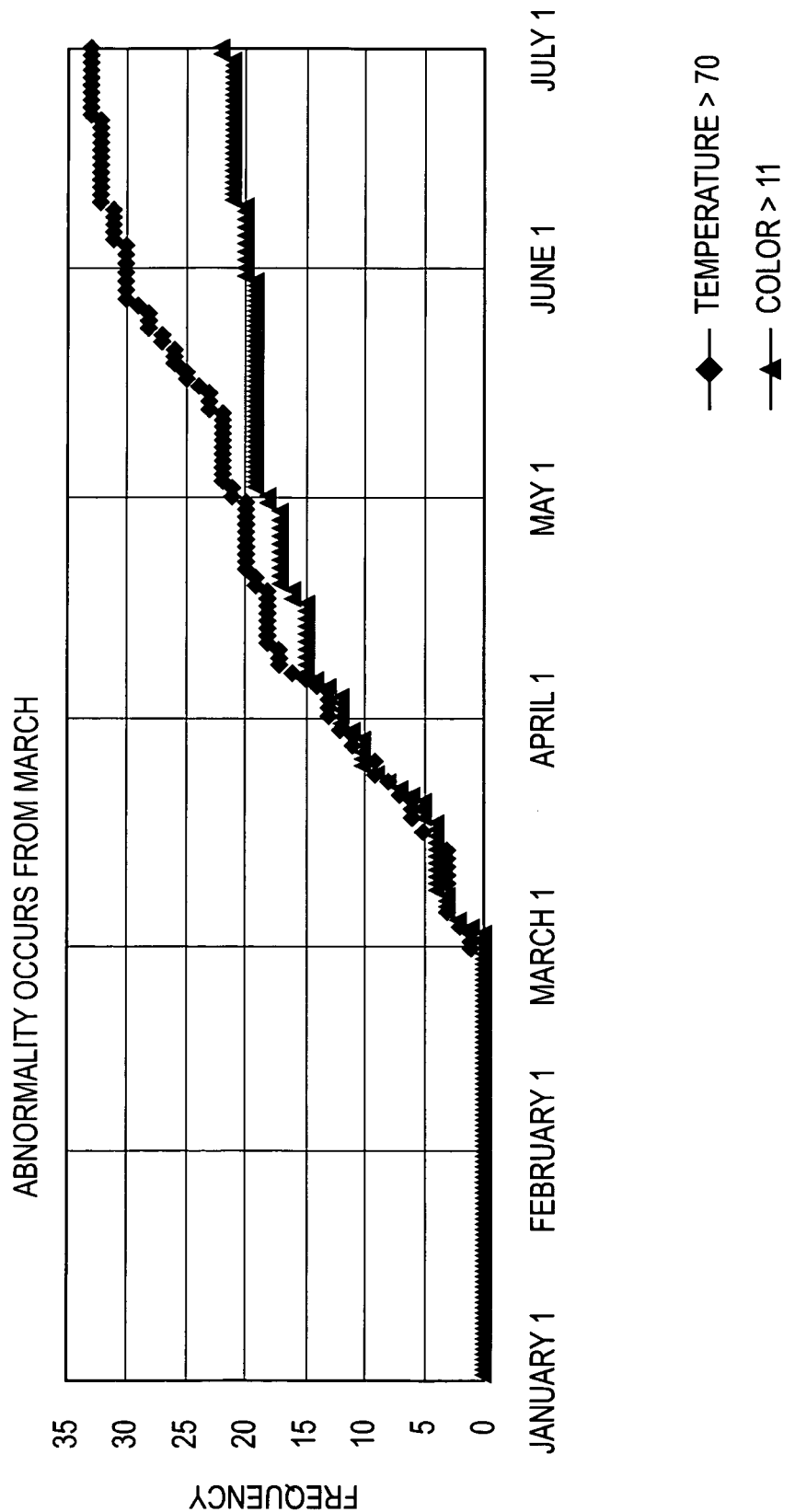

Fig. 8

REFINING STEP DATA

| | FIRST REFINING PROCESS | | SECOND REFINING PROCESS | | | SECOND REFINING PROCESS | | |
|---|---|---|---|---|---|---|---|---|
| Date | IMPURITY A | IMPURITY B | IMPURITY C | IMPURITY A | IMPURITY B | IMPURITY C | | |
| 2006/1/27 8:00 | 2.73 | 0.152 | 0.078 | 0.927 | 0.062 | 0.032 | | |
| 2006/1/27 16:00 | 1.105 | 0.078 | 0.016 | 0.592 | 0.076 | 0.02 | | |
| 2006/1/28 0:00 | 1.14 | 0.072 | 0.018 | 0.477 | 0.072 | 0.02 | | |
| 2006/1/28 8:00 | 1.278 | 0.052 | 0 | 0.522 | 0.046 | 0 | | |
| 2006/1/28 16:00 | 0.655 | 0.05 | 0 | 0.296 | 0.038 | 0 | | |
| ... | | | | | | | | |
| 2007/2/24 8:00 | 2.04 | 0.064 | 0.02 | 0.7 | 0.006 | 0 | | |
| 2007/2/24 16:00 | 1.61 | 0.002 | 0 | 0.42 | 0.004 | 0 | | |
| 2007/2/25 0:00 | 1.12 | 0.026 | 0 | 0.94 | 0.02 | 0 | | |
| 2007/2/25 8:00 | 1.25 | 0.076 | 0.02 | 0.53 | 0.046 | 0.006 | | |
| 2007/2/25 16:00 | 0.87 | 0.008 | 0 | 0.6 | 0.006 | 0 | | |
| 2007/2/26 0:00 | 1.92 | 0.03 | 0 | 1.35 | 0.028 | 0 | | |
| ... | | | | | | | | |
| 2009/1/24 0:00 | 1.18 | 0 | 0 | 0.41 | 0 | 0 | | |
| 2009/1/24 8:00 | 1.12 | 0.024 | 0 | 1.14 | 0.014 | 0 | | |
| 2009/1/24 16:00 | 3.49 | 0.02 | 0 | 0.62 | 0 | 0 | | |
| 2009/1/25 0:00 | 1.36 | 0.05 | 0.01 | 0.89 | 0.042 | 0.006 | | |

REACTION RATIO DATA

| Date | FIRST UNREACTION RATIO (%) | SECOND UNREACTION RATIO (%) |
|---|---|---|
| 2006/1/1 0:00 | 0.03 | 0.021 |
| 2006/1/2 0:00 | 0.024 | 0.029 |
| 2006/1/3 0:00 | 0.026 | 0.024 |
| 2006/1/4 0:00 | 0.025 | 0.021 |
| 2006/1/5 0:00 | 0.027 | 0.021 |
| ... | | |
| 2009/1/24 0:00 | 0.033 | 0.028 |
| 2009/1/24 0:00 | 0.057 | |
| 2009/1/24 0:00 | 0.063 | 0.036 |

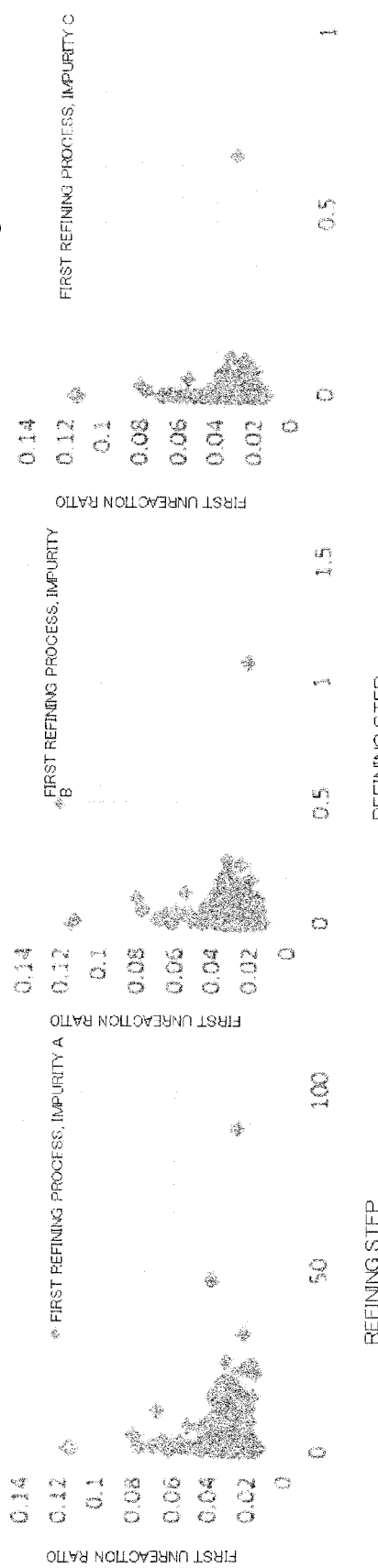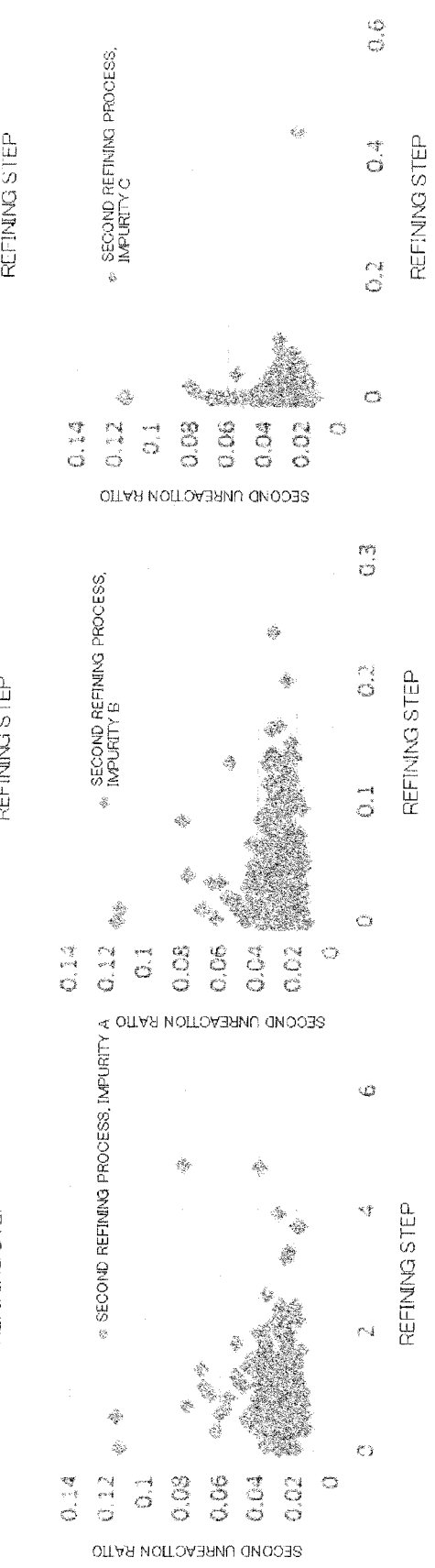

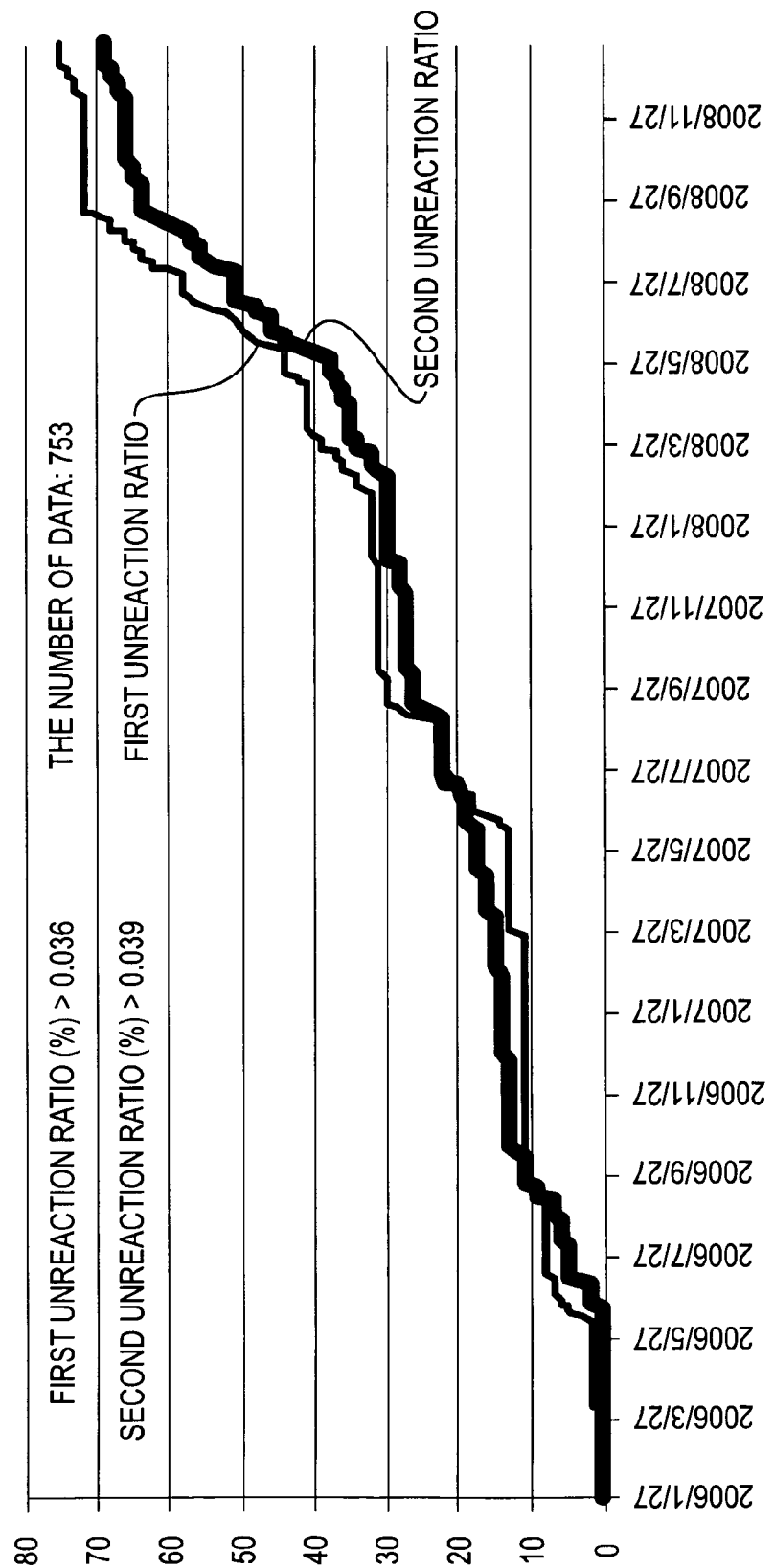

SYSTEM FOR IDENTIFYING CAUSE OF ABNORMALITY, METHOD OF IDENTIFYING CAUSE OF ABNORMALITY, AND PROGRAM FOR IDENTIFYING CAUSE OF ABNORMALITY

TECHNICAL FIELD

The present invention relates to a system for identifying cause of abnormality appearing in a product manufactured in the plant, a method of identifying cause of abnormality, and a program for identifying cause of abnormality.

PRIOR ART

Process industries such as Gas, LNG, Petroleum Refining, Petrochemicals, Organic Chemicals, Specialty Chemicals, Inorganic Chemicals, Polymers, Fibers, Films, Pharmaceuticals, Food & Beverages manufacture products in plant using various feedstock and often encounter the occurrence of an abnormality in the product. The cause of abnormality must be identified to keep the safe production, to minimize the release of waste to environment and to the workers, to improve product quality and to increase yield to be competitive.

Most of the abnormality in the product is caused by an abnormality of a raw material or an abnormality of a manufacturing condition. In most of the plants, real-time sensors are installed to record the process conditions such as temperature, pressure, flowrate, product quality and so on.

A statistical method is used to identify such a cause. More specifically, a correlation between a change in detected value obtained by sensors for manufacturing conditions and the state of a product is analyzed, or the manufacturing conditions, a moving average of fault occurrence, and an abnormal state of the product are compared with each other.

Patent Document 1 describes a system including a data input processing means that collects process data of a plant in units of predetermined cycles to store the state data in a plant database, a knowledge base in which at least abnormality determination knowledge and threshold value correction knowledge are stored, and an inference execution means that, when an abnormality is determined by comparing plant state data in each of the predetermined cycles and a threshold value stored in advance in the plant database on the basis of the abnormality determination knowledge, determines a way of exceeding the threshold value on the basis of past time-series data stored in the plant database on the basis of the threshold value correction knowledge and infers from a result obtained by comparing the plant state data with a value obtained by giving a margin to the threshold value that the determination of abnormality is made by a variation of the plant state data near the threshold value or that the determination of abnormality is made by an essential abnormality of the plant state.

PRIOR ART DOCUMENT

Patent Document

[Patent Document 1] See Unexamined Patent Publication No. H3-53123

SUMMARY OF THE INVENTION

Problem to be Solved by the Invention

However, in the plant described above, as factors that influence a manufacturing result of a product, in addition to the manufacturing conditions abnormalities are caused by the disturbances in one of many possible conditions such as temperatures, pressures, flow-rates, quality of raw materials. Therefore the preparation of knowledge base to find the cause among the pre-listed causes is not practical.

The present invention has been made in consideration of the above problem and has as its object to provide a system for identifying cause of abnormality in a product, a method of identifying cause of abnormality, and a program for identifying cause of abnormality.

Means for Solving the Problem

An invention described in claim 1 to solve the problem is a system for identifying the causes of abnormality appearing in the data of products produced in the plants and/or the data of manufacturing conditions of the plant, including a data storing device in which data of products data and/or the data of manufacturing conditions acquired for a predetermined set period; means that sets one threshold value or multiple threshold values for products for a predetermined set period; means that compares the data of the product with the product threshold value(s); means that accumulates the number of times that the data of the product falls within the reference range determined by the product threshold value(s) to acquire a trend and/or frequency related to the abnormality of the products; means that sets one threshold value or multiple threshold values for manufacturing conditions for a predetermined set period; means that compares the data of the manufacturing conditions with the threshold value(s); means that accumulates the number of times that the data of the manufacturing conditions fall within the reference range determined by the threshold value(s) to acquire a trend and/or frequency related to the abnormality of the manufacturing conditions; and means that compares the trend and/or frequency related to the abnormality of the products with the trend and/or frequency related to the abnormality of the manufacturing conditions to identify the cause of abnormality appearing in the product.

An invention described in claim 2 to solve the problem is the system for identifying the causes of abnormality described in claim 1, including means that changes one threshold value or multiple threshold values for products to make the product abnormality cumulative frequency is a predetermined percentage determined in advance with respect to the total number of measured data points; and means that changes one threshold value or multiple threshold values for manufacturing conditions to make the manufacturing condition cumulative frequency is a predetermined percentage with respect to the number of measured data points.

An invention described in claim 3 to solve the problem is the system for identifying the causes of abnormality described in claim 1, including means that creates graphs to show the trend and/or frequency related to the abnormality of the products; means that creates graphs to show the trend and/or frequency related to the abnormality of the manufacturing conditions; and means that identifies the causes of abnormality of the products based on the similarity of timing of sudden changes between the graphs.

An invention described in claim 4 to solve the problem is the system for identifying the causes of abnormality described in claim 1, including the data acquisition means of the raw materials, products and manufacturing conditions of which the data are related to plants and/or analytical equipment.

An invention described in claim 5 to solve the problem is the system for identifying the causes of abnormality described in claim 1, wherein the data in the storing device are past measured values including present measured values.

An invention described in claim 6 to solve the problem is a method for identifying the causes of abnormality appearing in the data of products produced in the plants and/or the data of manufacturing conditions of the plant, where in the data are stored in storing device, including the step that sets one threshold value or multiple threshold values for products for a predetermined set period; the step that compares the data of the product with the product threshold value(s); the step that accumulates the number of times that the data of the product falls within the reference range determined by the product threshold value(s) to acquire a trend and/or frequency related to the abnormality of the products; the step that sets one threshold value or multiple threshold values for manufacturing conditions for a predetermined set period; the step that compares the data of the manufacturing conditions with the threshold value(s); the step that accumulates the number of times that the data of the manufacturing conditions fall within the reference range determined by the threshold value(s) to acquire a trend and/or frequency related to the abnormality of the manufacturing conditions; and the step that compares the trend and/or frequency related to the abnormality of the products with the trend and/or frequency related to the abnormality of the manufacturing conditions to identify the cause of abnormality appearing in the product.

An invention described in claim 7 to solve the problem is the method for identifying the causes of abnormality described in claim 6, including the step that changes one threshold value or multiple threshold values for products to make the product abnormality cumulative frequency is a predetermined percentage determined in advance with respect to the total number of measured data points; and the step that changes one threshold value or multiple threshold values for manufacturing conditions to make the manufacturing condition cumulative frequency is a predetermined percentage with respect to the number of measured data points.

An invention described in claim 8 to solve the problem is the method for identifying the causes of abnormality described in claim 6, including the step that creates graphs to show the trend and/or frequency related to the abnormality of the products; the step that creates graphs to show the trend and/or frequency related to the abnormality of the manufacturing conditions; and the step that identifies the causes of abnormality of the products based on the similarity of timing of sudden changes between the graphs.

An invention described in claim 9 to solve the problem is the method for identifying the causes of abnormality described in claim 6, including the data acquisition steps of the raw materials, products and manufacturing conditions of which the data are related to plants and/or analytical equipment.

An invention described in claim 10 to solve the problem is the method for identifying the causes of abnormality described in claim 6, wherein the data in the storing device are past measured values including present measured values.

An invention described in claim 11 to solve the problem is a computer program for identifying the causes of abnormality appearing in the data of products produced in the plants and/or the data of manufacturing conditions of the plant, where in the data are stored in storing device, including the step that sets one threshold value or multiple threshold values for products for a predetermined set period; the step that compares the data of the product with the product threshold value(s); the step that accumulates the number of times that the data of the product falls within the reference range determined by the product threshold value(s) to acquire a trend and/or frequency related to the abnormality of the products; the step that sets one threshold value or multiple threshold values for manufacturing conditions for a predetermined set period; the step that compares the data of the manufacturing conditions with the threshold value(s); the step that accumulates the number of times that the data of the manufacturing conditions fall within the reference range determined by the threshold value(s) to acquire a trend and/or frequency related to the abnormality of the manufacturing conditions; and the step that compares the trend and/or frequency related to the abnormality of the products with the trend and/or frequency related to the abnormality of the manufacturing conditions to identify the cause of abnormality appearing in the product.

An invention described in claim 12 to solve the problem is the program for identifying the causes of abnormality described in claim 11, including the step that changes one threshold value or multiple threshold values for products to make the product abnormality cumulative frequency is a predetermined percentage determined in advance with respect to the total number of measured data points; and the step that changes one threshold value or multiple threshold values for manufacturing conditions to make the manufacturing condition cumulative frequency is a predetermined percentage with respect to the number of measured data points.

An invention described in claim 13 to solve the problem is the program for identifying the causes of abnormality described in claim 11, including the step that creates graphs to show the trend and/or frequency related to the abnormality of the products; the step that creates graphs to show the trend and/or frequency related to the abnormality of the manufacturing conditions; and the step that identifies the causes of abnormality of the products based on the similarity of timing of sudden changes between the graphs.

An invention described in claim 14 to solve the problem is the program for identifying the causes of abnormality described in claim 11, including the data acquisition steps of the raw materials, products and manufacturing conditions of which the data are related to plants and/or analytical equipment.

An invention described in claim 15 to solve the problem is the program for identifying the causes of abnormality described in claim 11, wherein the data in the storing device are past measured values including present measured values.

Effect of the Invention

According to the present invention, among a large number of conditions that may cause defects, condition acting as a cause of defect in a product can be easily identified.

BRIEF DESCRIPTION OF THE DRAWINGS

FIGS. 5A and 5B show results obtained by performing statistic processing to the data shown in FIG. 4, in which FIG. 5A is a graph showing a correlation and FIG. 5B is a graph showing a moving average.

FIGS. 6A to 6D show cumulative values of the numbers of abnormalities of the color data shown in FIG. 4, in which FIG. 6A is a graph showing a case obtained when a threshold value is 5, FIG. 6B is a graph showing a case obtained when the threshold value is 10, FIG. 6C is a graph showing a case obtained when the threshold value is 12, and FIG. 6D is a graph showing a case obtained when the threshold value is 11.

FIG. 7 is a graph showing a cumulative value of the color data and the temperature data shown in FIG. 4. It can be easily seen that higher temperature caused the higher color of the product starting in March, which is not possible to understand by the simple statistical analysis which is readily available in the spreadsheet-type software.

FIG. 8 is a table in the second example showing values of impurities A, B, and C, a first unreaction ratio, and a second unreaction ratio in a first refining process and a second refining process having an object to identify the cause of increase of un-reaction ratio as an embodiment of the present invention.

FIGS. 9A-F show correlative distribution charts of the measured values shown in FIG. 8. It is not clear which impurities, if any are the cause of higher un-reaction ratio from the simple statistical analysis.

FIGS. 10A, 10B, and 10C show cumulative values in the second example according to an embodiment of the present invention. FIG. 10A is a graph showing cumulative values of a first unreaction ratio and a second un-reaction ratio and it can be seen that un-reaction ratio suddenly increased in February 2008. FIG. 10B is a graph showing cumulative values of the impurities A, B, and C in the first refining process and the second refining process. The impurities having the same cumulative behavior are thought to be the cause of the higher un-reaction ratio. FIG. 10C is a graph obtained by superposing the graphs shown in FIGS. 10A and 10B on each other, and the strongly related variables are shown in FIGS. 11A and 11B.

MODE FOR CARRYING OUT THE INVENTION

A system for identifying cause of abnormality, a method of identifying cause of abnormality, and a program for identifying cause of abnormality according to a mode (to be simply referred to as an embodiment hereinafter) for carrying out the present invention.

Figure 1:
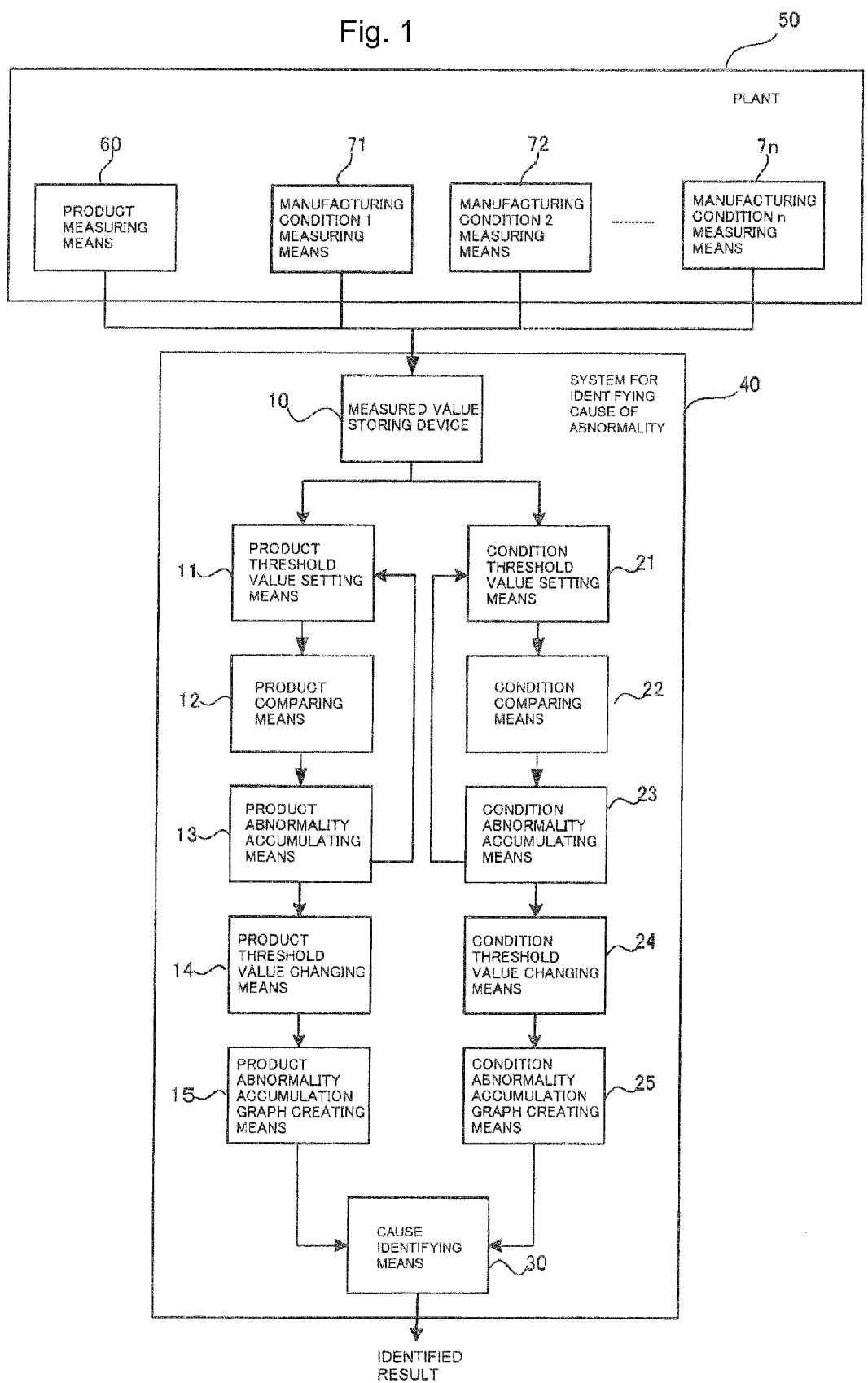
FIG. 1 is a block diagram showing a configuration of a system for identifying cause of abnormality according to an embodiment of the present invention.

A system for identifying cause of abnormality according to the embodiment will be described below. FIG. 1 is a block diagram showing a configuration of a system for identifying cause of abnormality according to the embodiment of the present invention. A system 40 for identifying cause of abnormality (to be referred to as a identifying system 40 hereinafter) according to the embodiment specifies which among a raw material and various conditions in processing steps causes an abnormality appearing in a finished product manufactured in a plant 50.

The plant 50 processes a raw material to produce a product. The quality of the product is managed with, for example, colors. The color of the finished product is measured by a product measuring means 60 configured by, for example, a color sensor and then digitized. Quality may be managed on the basis of, in addition to the colors, sizes, shapes, weights, relative weights, and other measured values. In this case, a sensor required for measurement is used. Alternatively, manual measurement can be done and the data can be input to the data storing device. The number of product measuring means is not limited to one, and a plurality of product measuring means can be installed.

In manufacturing processes, various conditions such as a temperature, a pressure, and a processing time are measured with condition measuring means such as a temperature sensor, a pressure sensor, and a timer. As the condition measuring means, a plurality of condition measuring means are arranged to measure manufacturing conditions that may be the causes. FIG. 1 shows a manufacturing condition 1 measuring means 71, a manufacturing condition 2 measuring means 72, . . . , a manufacturing condition n measuring means 7n. In this case, the measuring means periodically performs measurement at predetermined time or in a predetermined period. This measurement need not be always periodically performed, and may be performed in units of batches or at other opportunities as long as the measurement is performed in chronological order.

The identifying system 40 is connected to a product measuring means 60 and the manufacturing condition 1 measuring means 71 to the manufacturing condition n measuring means 7n and includes a measured value storing device 10 that stores measurement data from the measuring means. The measured value storing device 10 stores the measurement data for a long period of time, is configured by a hard disk drive device, a semiconductor memory, and the like to make it possible to output an arbitrary measured values in an arbitrary period.

The identifying system 40 includes a product threshold value setting means 11, a product comparing means 12, a product abnormality accumulating means 13, a product threshold value changing means 14, a product abnormality accumulation graph creating means 15, a manufacturing condition threshold value setting means 21, a manufacturing condition comparing means 22, a manufacturing condition abnormality accumulating means 23, a manufacturing condition threshold value changing means 24, a manufacturing condition abnormality accumulation graph creating means 25, and a cause identifying means 30.

The product threshold value setting means 11 sets a product threshold value serving as a determination reference used to determine whether a product measured value acquired from the measured value storing device 10 is normal. The product measured value is, for example, a value to compare color with each other when the measured value of a product is a color. When the measured value exceeds the product threshold value, a finished product is determined as an abnormal product. A plurality of threshold values, for example, three threshold values may be set to determine normal, caution needed, and rejected product.

The product comparing means 12 compares a product measured value and a product threshold value with each other. The product abnormality accumulating means 13 accumulates the numbers of times that the product measured value exceeds the product threshold value for a set period on the basis of a comparison result in the product comparing means 12 for the set period to acquire a product abnormality cumulative frequency.

The product threshold value changing means 14 changes the product threshold value such that the product abnormality cumulative frequency acquired by the product abnormality accumulating means 13 is a predetermined percentage determined in advance with respect to the total number of measurements. This percentage can be, for example, about 10% of the number of measurements. The product threshold value changing means 14 increases or decreases the value of the product threshold value such that the percentage is a predetermined value.

The product abnormality accumulation graph creating means 15 creates a graph on the basis of a product cumulative frequency acquired on the basis of the product threshold value set by the product threshold value changing means 14. In the graph, time is plotted on the abscissa, and the frequency is plotted on the ordinate. On the abscissa, batch numbers and variables representing other elapsed time can be plotted on the abscissa.

The condition threshold value setting means 21 sets a condition threshold value to be compared with a manufacturing condition measured value acquired from the measured value storing device 10. As the condition threshold value, a plurality of condition threshold values are set for the condition measured values.

The condition comparing means 22 compares the manufacturing condition measured value with the condition threshold value. The condition abnormality accumulating means 23 accumulates the numbers of times that the manufacturing condition measured value exceeds the condition threshold value for the set period to acquire a condition cumulative frequency. The cumulative frequency is created for the sum of the condition measured values.

The condition threshold value changing means 24 changes the condition threshold value such that the condition cumulative frequency is a predetermined percentage of the number of measurements. This percentage may be the same value as in the product threshold value changing means 14, for example, about 10% of the number of measurements. The condition threshold value changing means 24 increases or decreases the value of the product threshold value such that the percentage is a predetermined value.

The condition abnormality accumulation graph creating means 25 creates a graph on the basis of a condition abnormality frequency acquired on the basis of the product threshold value set by the condition threshold value changing means 24. In the graph, time is plotted on the abscissa, and a frequency is plotted on the ordinate. The graph is created with respect to a condition the sum of which is measured. On the abscissa, batch numbers and variables representing other elapsed time can be plotted.

The cause identifying means 30 compares the graph of the product abnormality cumulative frequency created by the product abnormality cumulative graph creating means 15 and the graph of the plurality of condition cumulative frequencies created by the condition abnormality cumulative graph creating means 25 to identify a condition in which the product is abnormal on the basis of a distribution state of cumulative frequencies. This identifying step is performed such that the graph about the product is compared with the graphs about the conditions to identify a graph about a condition in which an inflection point and a changing point are present in the same period as that in which an inflection point and a changing point are generated in the graph of the product.

The identifying system 40 can be realized such that a program for identifying cause of abnormality according to the embodiment is executed in a computer including a CPU (Central Processing Unit: processor), a RAM (Random Access Memory), a ROM (Read Only Memory), an HDD (Hard Disc Drive), and the like. The program is recorded on a recording medium such as a Hard Disk and/or a DVD such that the program can be read by the computer. The identifying system 40 is arranged at a position different from that of the plant 50, and connects measured values of the product measuring means 60 and the manufacturing condition 1 measuring means 71 to the manufacturing condition n measuring means 7n of the identifying system 40 with a line such as the Internet to make it possible to identify a cause. The measured value storing device 10 is detachably arranged on the plant 50. When an abnormality occurs in the product, a measured value from the measured value storing device 10 removed from the plant 50 is input to the identifying system 40 to make it possible to identify a cause.

Figure 2:
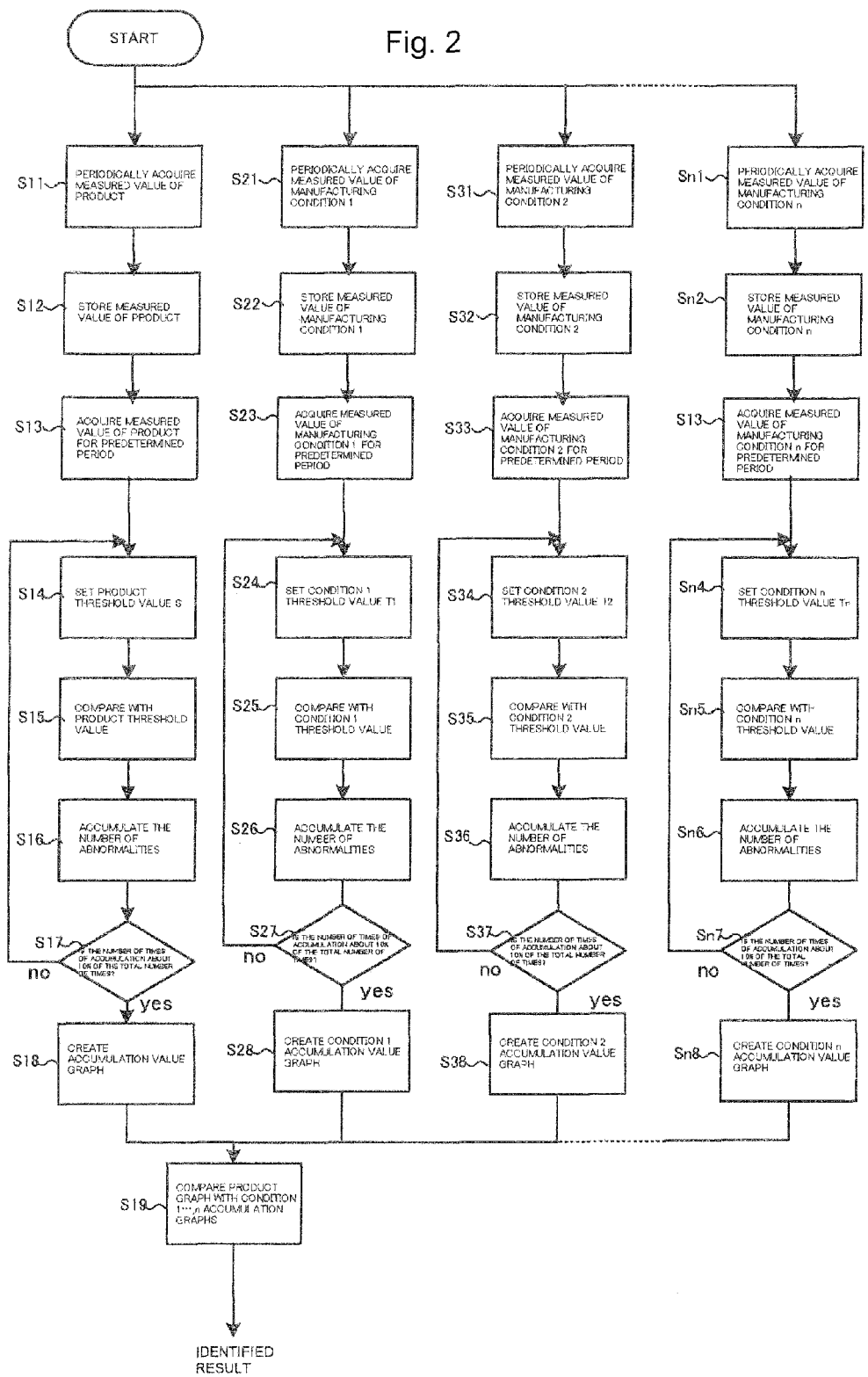
FIG. 2 is a flow chart showing a flow of processes in a system for identifying cause of abnormality according to an embodiment of the present invention.
Figure 3:
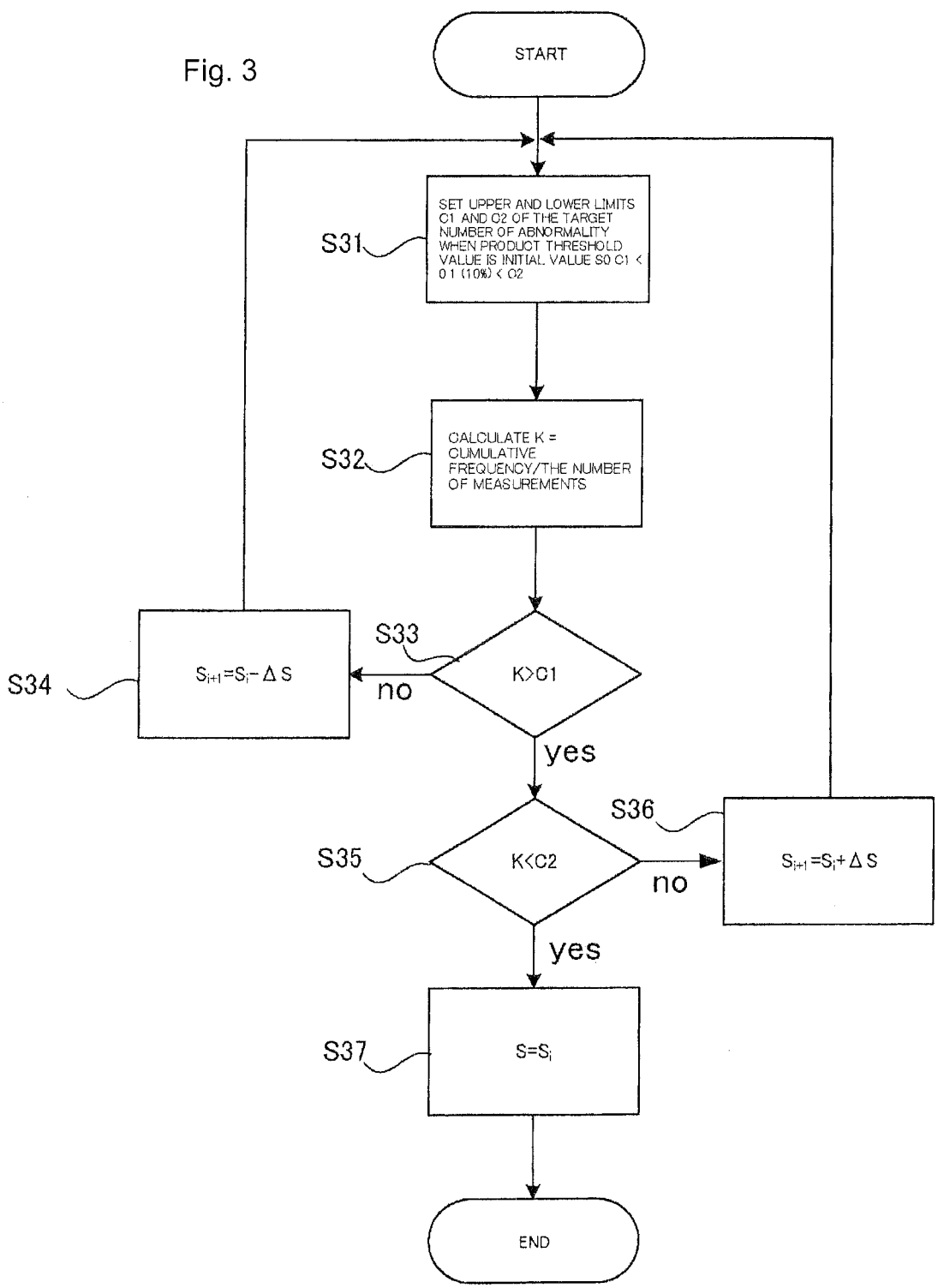
FIG. 3 is a flowchart showing a process of determining a threshold value in the processes shown in FIG. 2.
Figure 4:
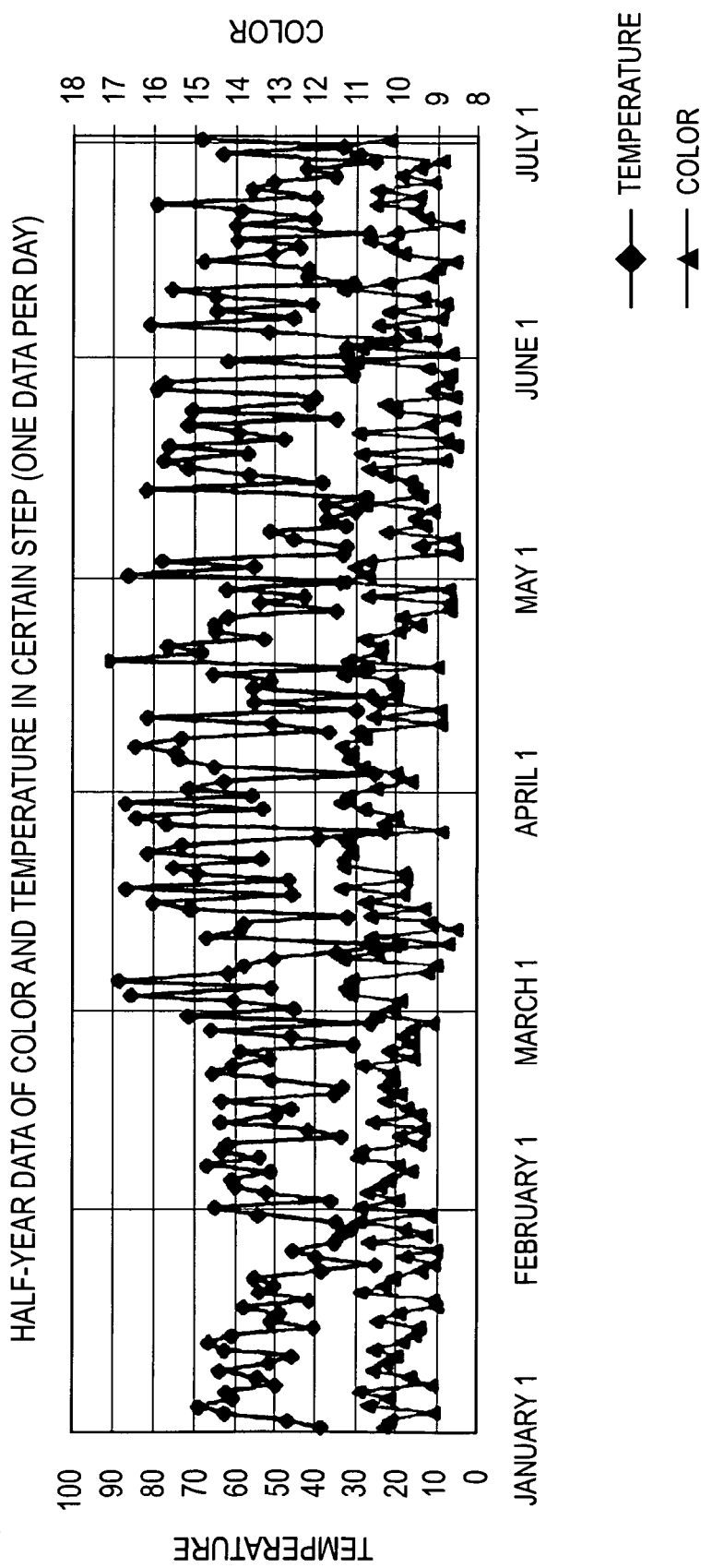
FIG. 4 is a graph showing changes in color of a product and a process temperature in the first example that serve as objects to be processed by a system for identifying cause of abnormality according to an embodiment.
Figure 5A:
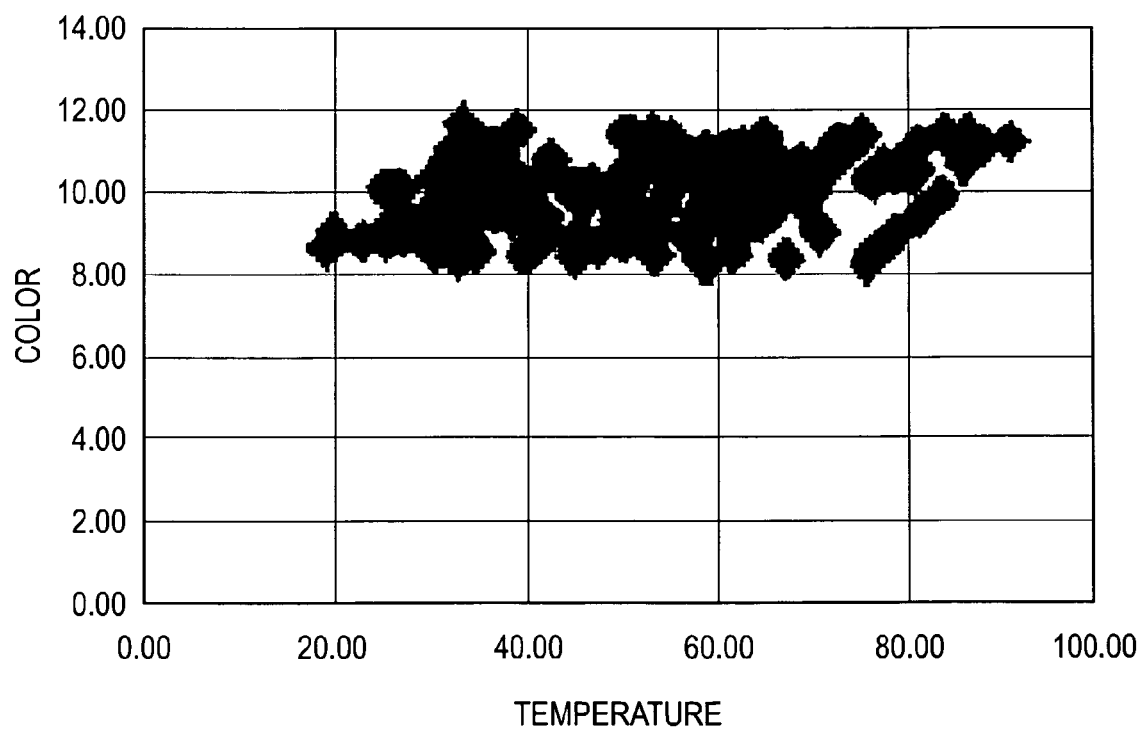
Figure 5B:
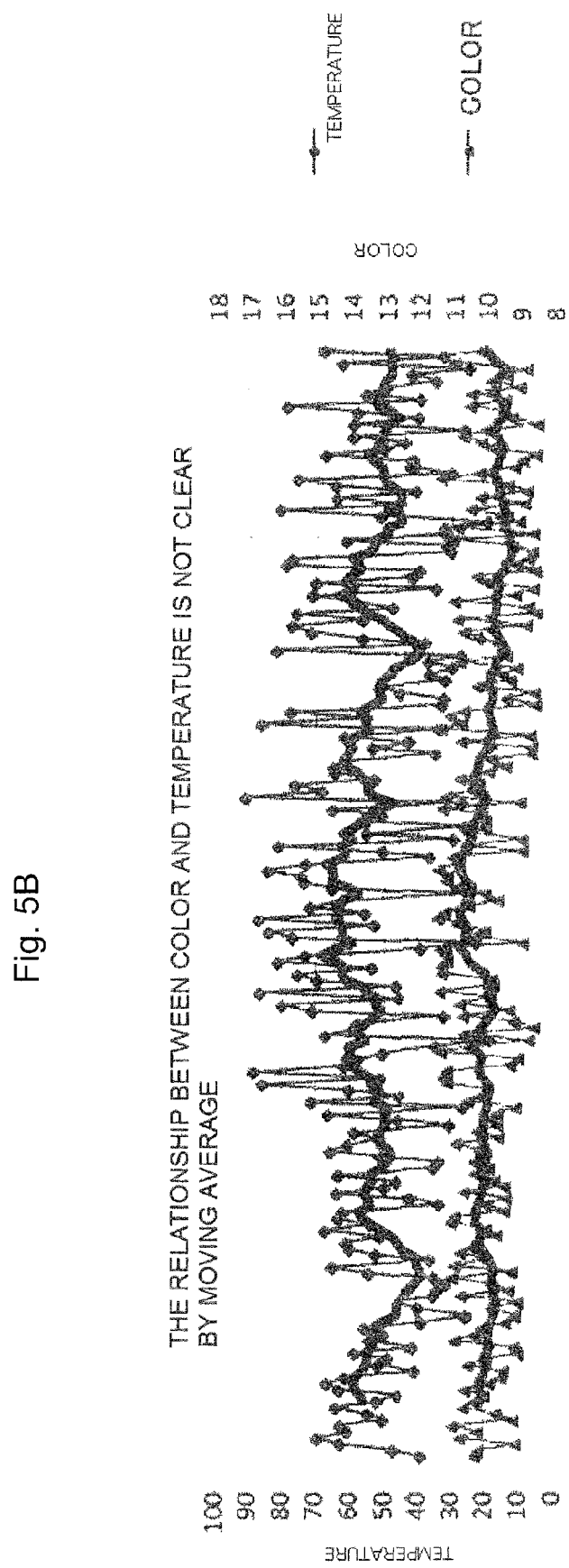
Figure 6A:
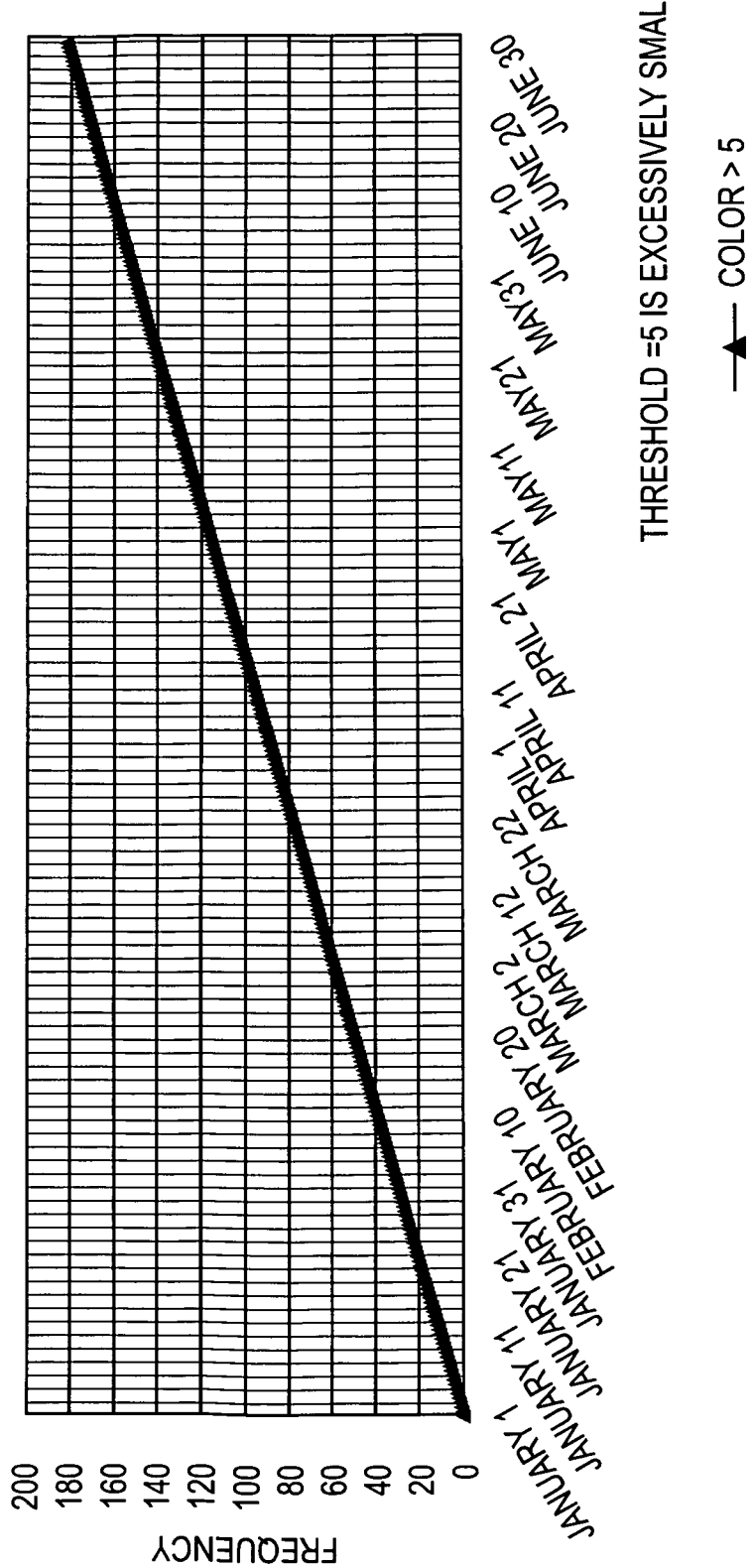
Figure 6B:
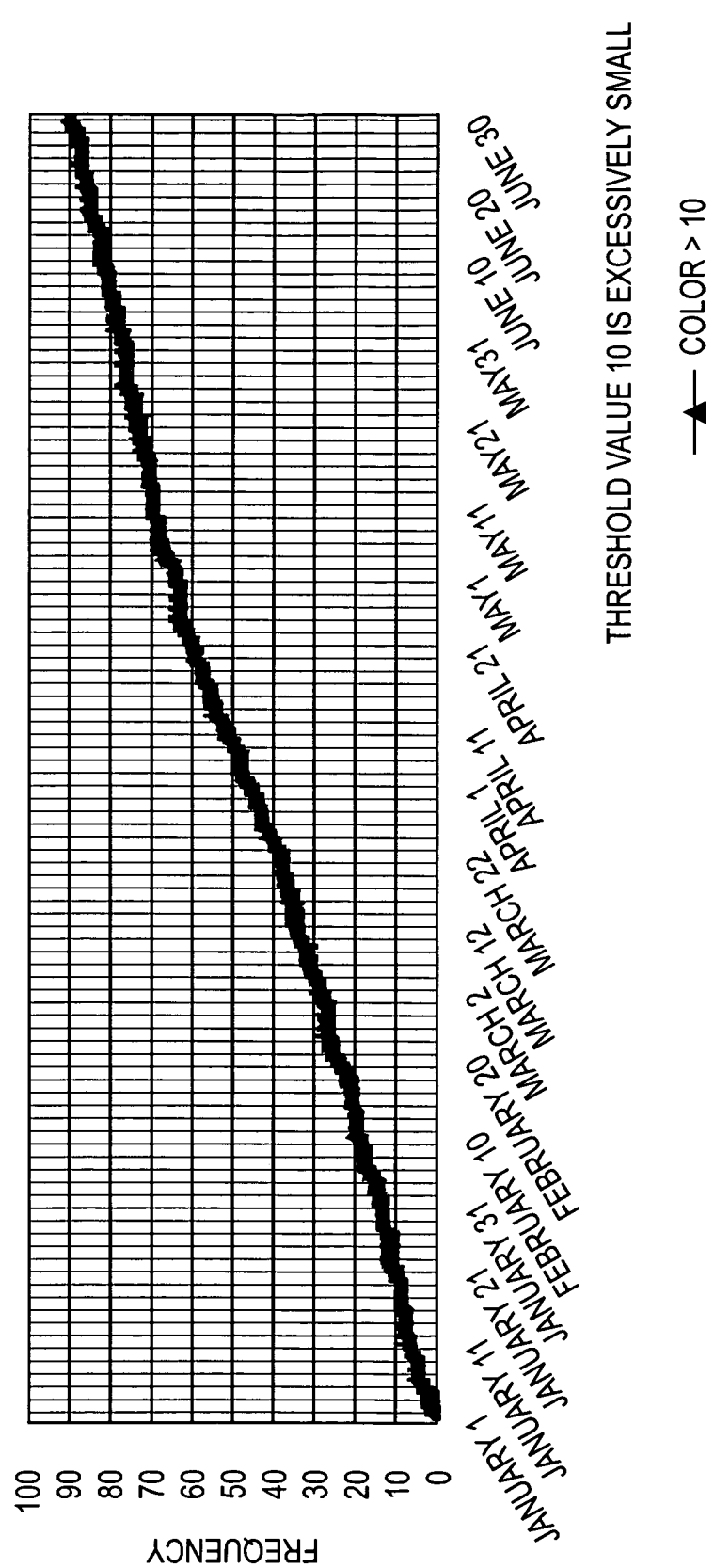
Figure 6C:
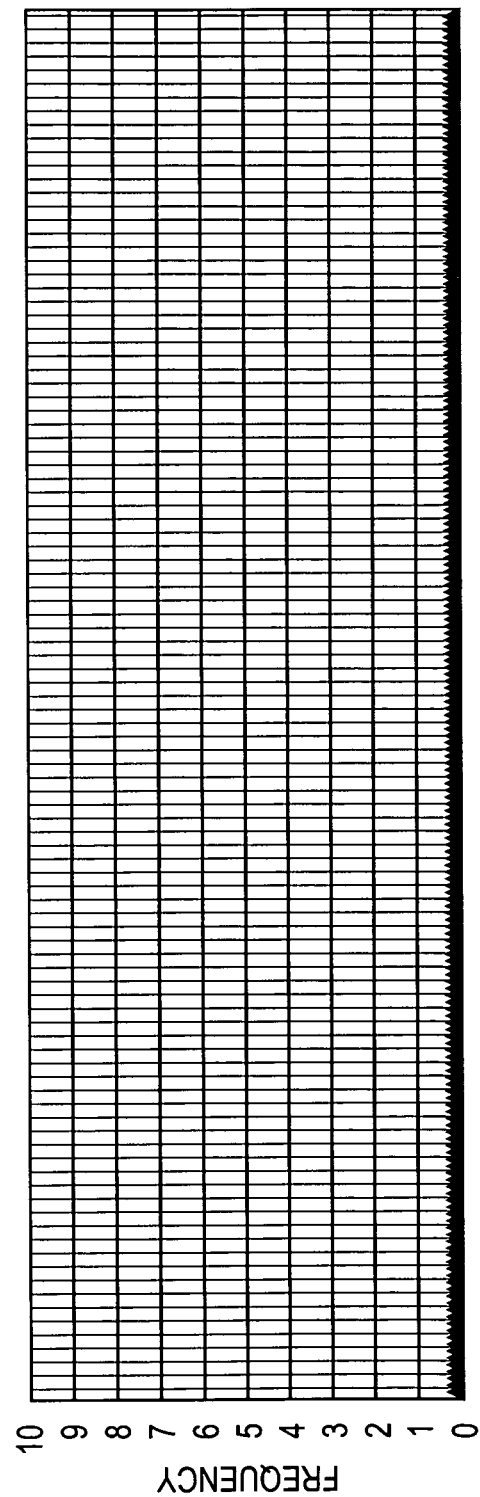

Processes in the identifying system 40 will be described below. FIG. 2 is a flow chart showing a flow of processes of the system for-identifying cause of abnormality according to the embodiment of the present invention, and FIG. 3 is a flow chart showing processes of determining a threshold value in the processes shown in FIG. 2. FIG. 4 is a graph showing changes in color of a product and a process temperature in the first example that serve as objects to be processed by a system for identifying cause of abnormality according to an embodiment. FIGS. 5A and 5B show results obtained by performing statistic processing to the data shown in FIG. 4, in which FIG. 5A is a graph showing a correlation and FIG. 5B is a graph showing a moving average. FIGS. 6A to 6D show cumulative values of the numbers of abnormalities of the color data shown in FIG. 4, in which FIG. 6A is a graph showing a case obtained when a threshold value is 5, FIG. 6B is a graph showing a case obtained when the threshold value is 10, FIG. 6C is a graph showing a case obtained when the threshold value is 12, and FIG. 6D is a graph showing a case obtained when the threshold value is 11.

In the plant 50, the product measuring means 60 and the manufacturing condition 1 measuring means 71 to the manufacturing condition n measuring means 7n periodically perform measurements (steps S11, S21, S31, and Sn1). The measured values are stored in the measured value storing device 10 of the identifying system 40 (steps S12, S22, S32, and Sn2).

When an abnormality occurs in the product, measured values of the product and measured value of condition 1 to condition n for a predetermined past period are sequentially taken in (steps S13, S23, S33, and Sn3).

FIG. 4 shows the color of a product and, as a manufacturing condition, measured values of temperatures in a certain step for the last half year. The temperatures and the color related to the measured values, as shown in FIG. 5A, are not correlated well to each other. Even the moving averages of the temperatures and the color do not have correlation either as shown in FIG. 5B.

In the identifying system 40 according to the embodiment, in the product threshold value setting means 11, a product threshold value S is determined (step S14). The product comparing means 12 compares the taken product measured value with the product threshold value S (step S15), the product abnormality accumulating means 13 accumulates the results (step S16) to calculate the distribution thereof, and the product threshold value changing means 14 sets the value of the product threshold value S such that the cumulative number is 10% of the number of measurements (step S17).

This will be described with reference to the example shown in FIG. 6. In this example, the number of measurements is the number for a half year, i.e., 180. When product threshold value S=5 is satisfied, the product abnormality cumulative frequency exceeds 180 and is excessively large (FIG. 6A). Furthermore, when product threshold value S=10 is adopted, the product abnormality cumulative frequency is about 80 and still large (FIG. 6B). Thus, when product threshold value S=12, the product abnormality cumulative frequency becomes "0" and cannot be compared with the reference value (FIG. 6C). In addition, when product threshold value S=11, the product abnormality cumulative frequency becomes about 20 thereby obtaining an appropriate distribution (FIG. 6D).

In the cause identifying system 40 according to the embodiment, as shown in FIG. 3, an initial value S0 of the product threshold value S and two constants C1 and C2 are set (step S31). In this case, it is assumed that C1<0.1 (10%)<C2 is satisfied. On the basis of the values, a product abnormality cumulative frequency is calculated, a percentage K to the number of measurements is calculated (step S32), and the value S is increased or decreased such that the percentage K is set to a value between C1 and C2. When the percentage K is smaller than C1 (yes in step S33), a predetermined $\Delta S$ is subtracted from a product threshold value Si (Si+1=Si+$\Delta s$ (i=0, 1, . . . ): step S34). On the other hand, when the percentage K is larger than C2 (yes in step S35), the predetermined $\Delta s$ is added to the product threshold value Si (Si+1=Si+$\Delta S$: step S36). In this manner, the value of the product threshold value S is determined such that C1<K<C2 is satisfied. The product abnormality accumulation graph creating means 15 creates a graph based on a cumulative frequency distribution (see FIG. 6C). An increasing direction of the condition threshold value and an increasing direction of an abnormality occurrence frequency may be opposite to those in the example. In this case, the increasing/decreasing direction of the threshold value is reversed.

On the other hand, in the manufacturing condition threshold value setting means 21, manufacturing condition threshold values B1 to Bn for the taken conditions 1 to n are determined (step S24, S34, and Sn4). The condition comparing means 22 compares the taken condition measured values with manufacturing condition threshold values T1 to Tn (steps S25, S35, and Sn5). Furthermore, the manufacturing condition abnormality accumulating means 23 accumulates the results (steps S26, S36, and Sn6) to calculate a distribution thereof, and the manufacturing condition threshold value changing means 24 sets the manufacturing condition threshold values B1 to Bn such that the cumulative number is 10% of the number of measurements (steps S27, S37, and Sn7). A procedure of determining the manufacturing condition threshold values B1 to Bn is the same as that shown in FIG. 3. In addition, the condition abnormality accumulation graph creating means 25 creates a graph based on a cumulative frequency distribution (step S28, S38, and Sn8).

The cause identifying system 40 compares the created product accumulation graph with a condition accumulation graph to satisfy a cause on the basis of a period of occurrence of a change of each of the graphs (step S19). FIG. 7 is a graph showing a cumulative value of the color data and the temperature data shown in FIG. 4. In this example, a period of occurrence of an abnormal temperature and a period of occurrence of an abnormal color are the same period (March), and it can be presumed that a cause of color abnormality in a finished product is caused by an abnormal temperature. Although an abnormal color decreases from May, since an abnormal temperature continues, it is suggested that the abnormal color is caused by not only the temperature but also another cause of which the data had not been measured.

As described above, according the system for identifying cause of abnormality according to the embodiment, a cause of an abnormality in a product that cannot be identified by a simple correlation or a moving average can be easily specified.

Two or more product threshold values can be set. For example, three product threshold values, for example, S1, S2, and S3 are set. The value S1 is defined as a normal level, the value S2 is defined as a caution-needed level, and the value S3 is defined as a product reject level, so that causes can be specified to the product threshold values, respectively. At this time, product threshold values in step S14 in FIG. 2 are defined as threshold values, and the steps including step S15 to step S19 are executed in parallel or at random. In this manner, causes corresponding to changes of different product threshold values can be specified.

An example of second identifying of a cause will be described below. In a plant in which a raw material is reacted in two stages including a first refining process and a second refining process, remains of an unreacted raw material from a certain point of time pose a problem. Data is analyzed to examine whether a problem is posed in a refining step. Impurities related to the refining step are of three types, i.e., an impurity A, an impurity B, and an impurity C. As unreaction ratios, raw materials of two types, i.e., a first unreaction ratio and a second unreaction ratio are analyzed.

FIG. 8 is a table showing the values of the impurities A, B, and C, the first unreaction ratio, and the second unreaction ratio in the first refining process and the second refining process in the second example that is an object to be processed by the system for identifying cause of abnormality in the un-reaction ratios according to the embodiment of the present invention. Measurement is performed three times a day in each of the refining steps, and measurement is performed once a day in the reaction step to automatically store the measured values in the measured value storing device 10. A measurement period is Jan. 1, 2006 to Jan. 25, 2009. The table in FIG. 8 shows a part of the period. When a correlation diagram about these values was drawn, a strong correlation as shown in FIG. 9 could not be found.

Figure 10B:
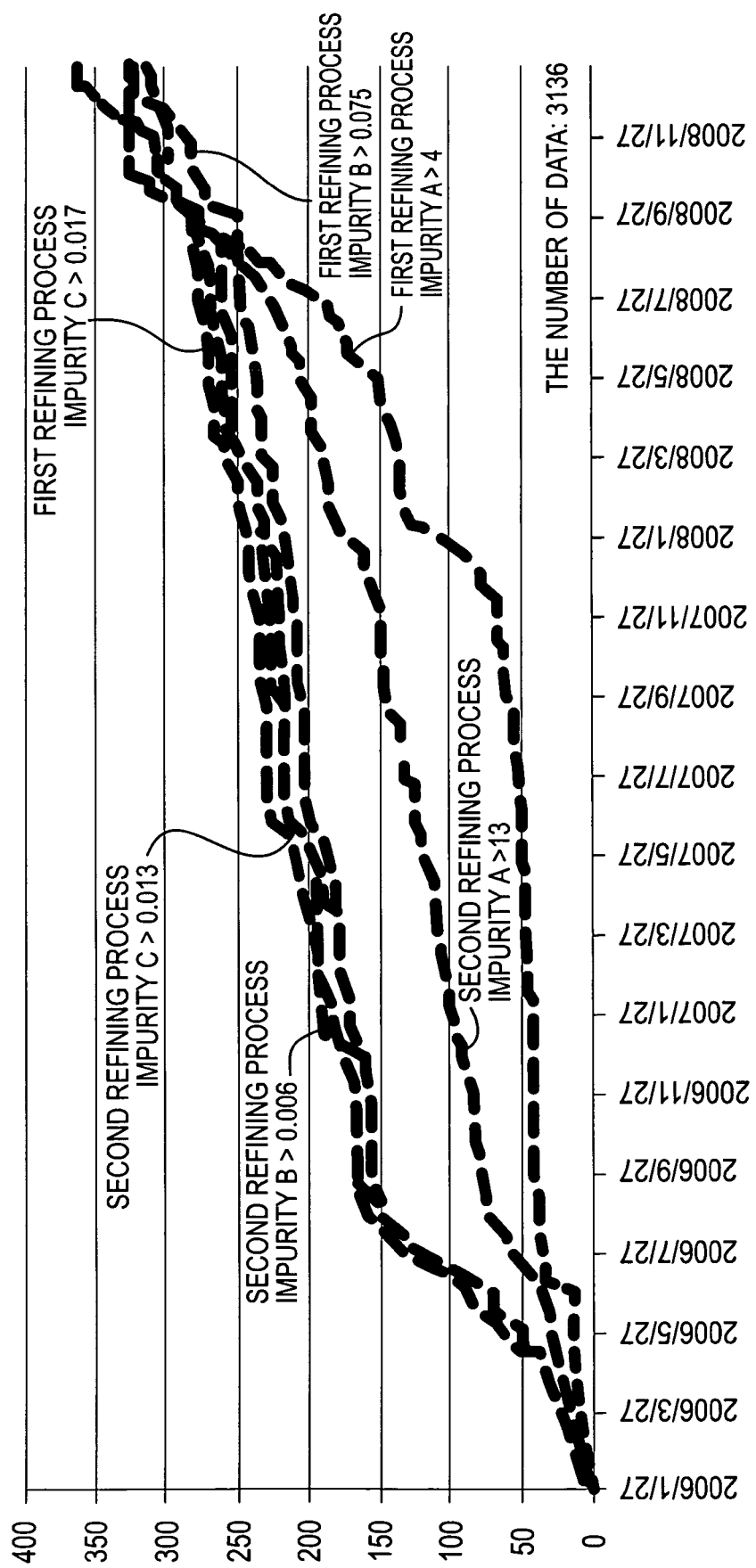
Figure 10C:
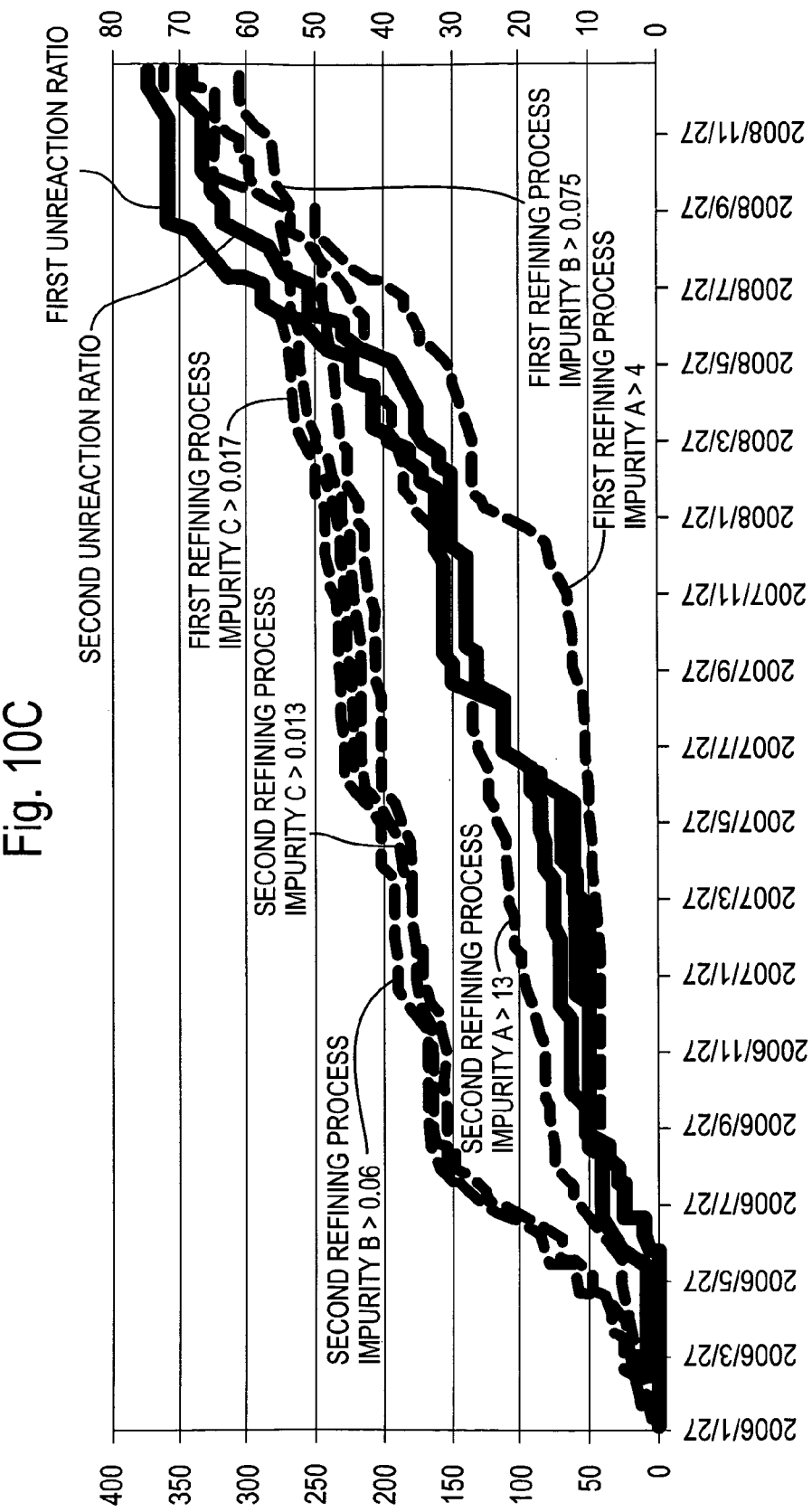
Figure 11A:
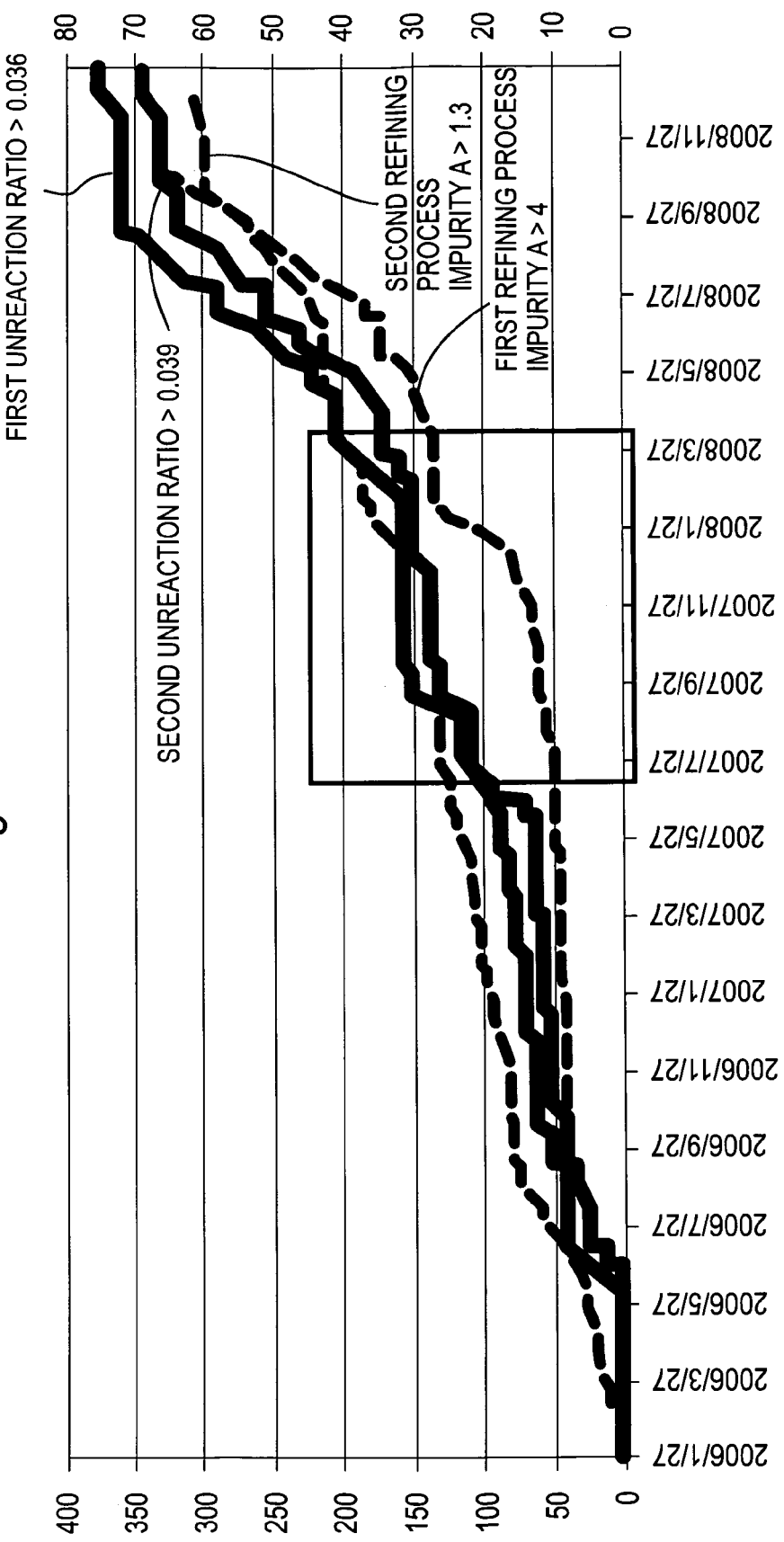
FIGS. 11A and 11B show that the first and second un-reaction ratios have the similar tendency and that the higher un-reaction ratio is caused by higher impurity A in the first refining process.
Figure 11B:
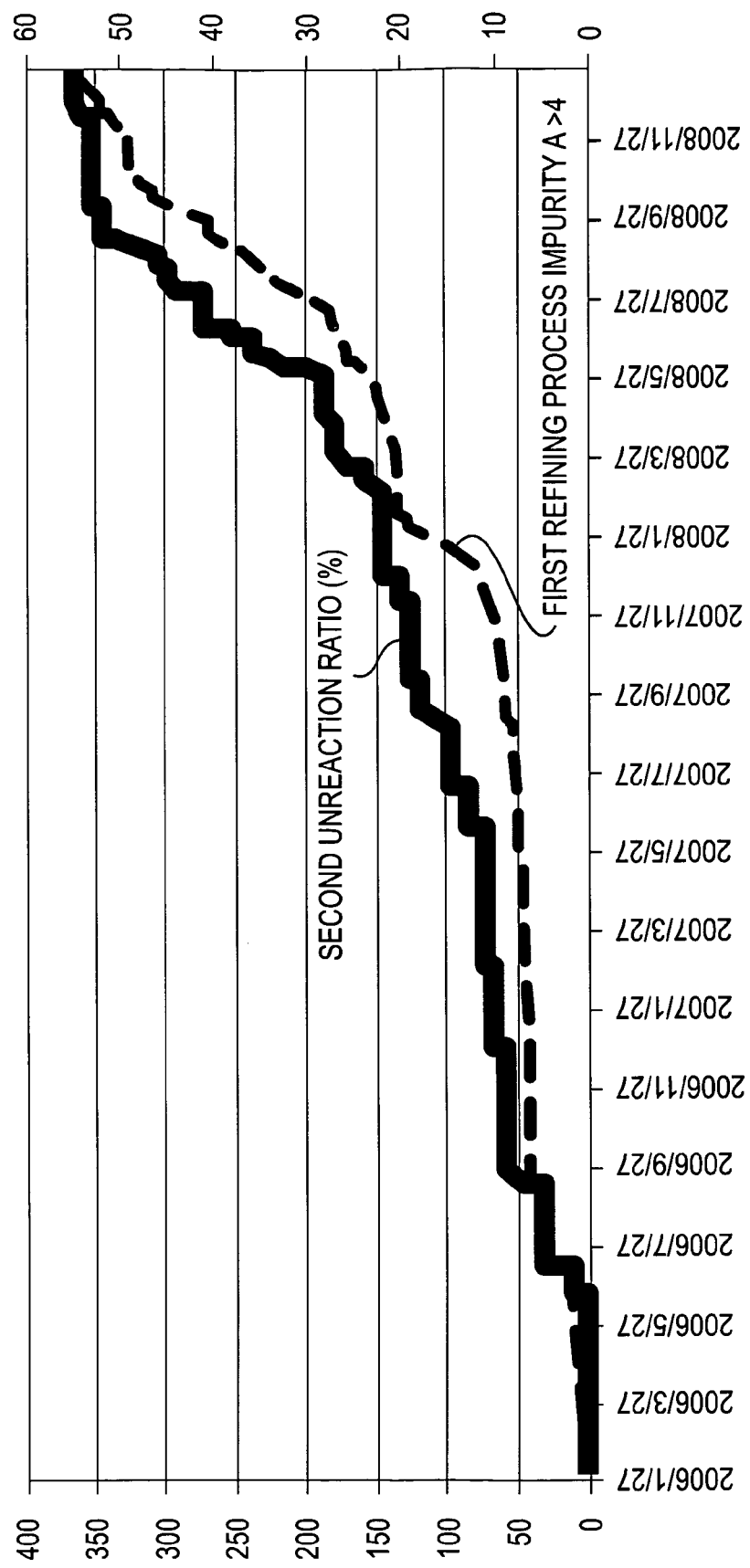
Figure 12:
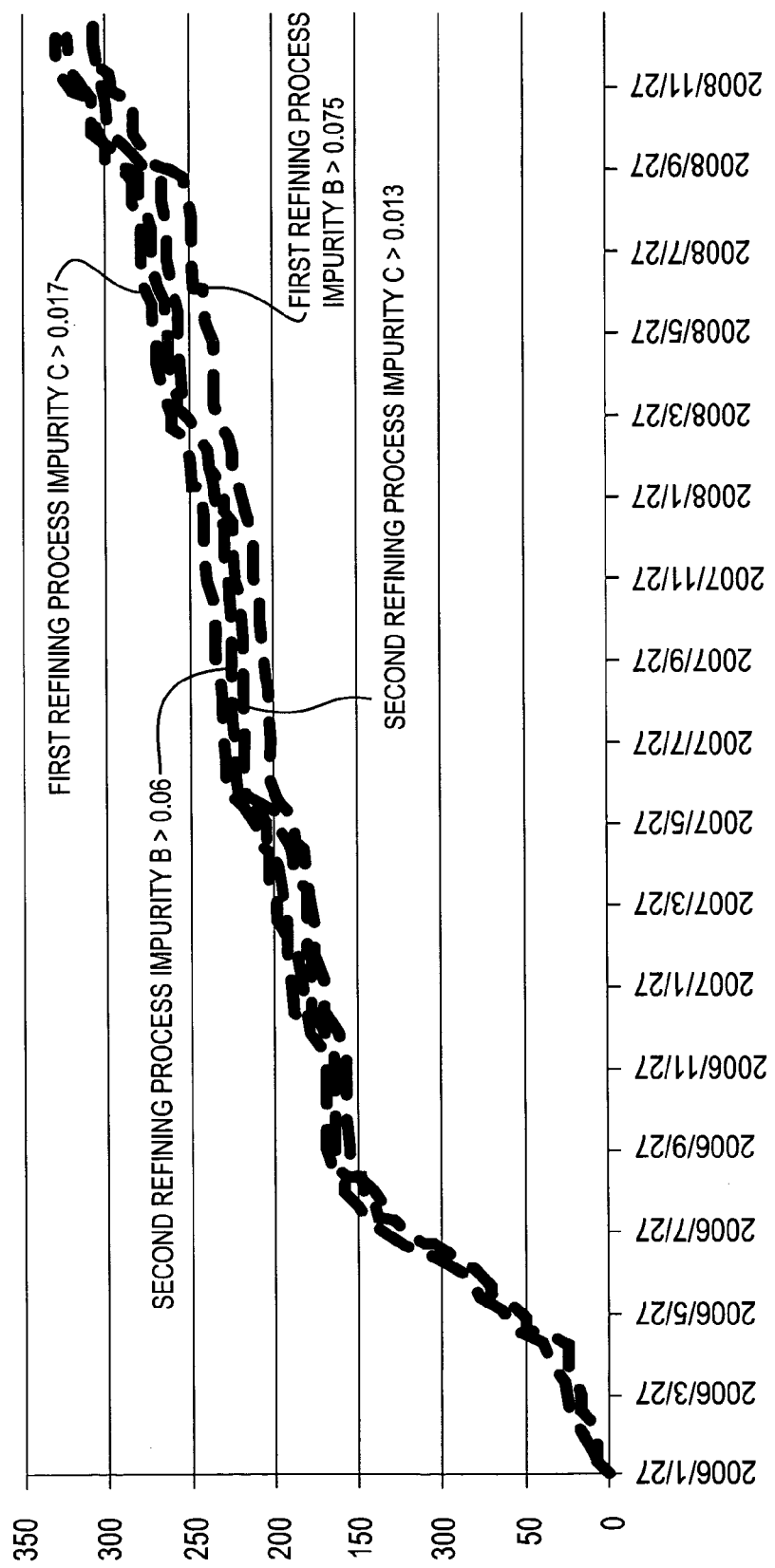
FIG. 12 is a graph showing cumulative values of the impurities B and C in the first refining process and cumulative values of the impurities B and C in the second refining process in the second example in pile. They are not the causes of the higher un-reaction ratios but it is possible to understand that all of them have the similar cumulative tendency. This information was not available by the simple statistical analysis.

The system for identifying cause of abnormality according to the present invention was applied to the measured values stored in the measured value storing device 10 to identify a cause of higher un-reaction ratios. FIGS. 10A, 10B, and 10C show cumulative values in the second example according to an embodiment of the present invention. FIG. 10A is a graph showing cumulative values of a first un-reaction ratio and a second un-reaction ratio and it can be seen that un-reaction ratio suddenly increased in February 2008. FIG. 10B is a graph showing cumulative values of the impurities A, B, and C in the first refining process and the second refining process. The impurities having the same cumulative behavior are thought to be the cause of the higher un-reaction ratio. FIG. 10O is a graph obtained by superposing the graphs shown in FIGS. 10A and 10B on each other, and the strongly related variables are shown in FIGS. 11A and 11B. FIGS. 11A and 11B show that the first and second un-reaction ratios have the similar tendency and that the higher un-reaction ratio is caused by higher impurity A in the first refining process. FIG. 12 is a graph showing cumulative values of the impurities B and C in the first refining process and cumulative values of the impurities B and C in the second refining process in the second example in pile. They are not the causes of the higher un-reaction ratios but it is possible to understand that all of them have the similar cumulative tendency. This information was not available by the simple statistical analysis.

Cumulative values were calculated according to the processes shown in FIG. 2 and FIG. 3, and the threshold values of the cumulative values are set such that the first unreaction ratio and the second unreaction ratio are 10% of the number of data, i.e., 756. The threshold value of the first unreaction ratio was 0.036, and the threshold value of the second unreaction ratio was 0.039. A graph of cumulative values is shown in FIG. 10A.

The threshold values of the impurity A, the impurity B, and the impurity C in the first refining process and the second refining process were set by the same processes as described above such that the threshold values were 10% of the number of data, i.e., 3136. In the first refining process, the threshold value of the impurity A was 4, the threshold value of the impurity B was 0.075, and the threshold value of the impurity C was 0.017. In the second refining process, the threshold value of the impurity C was 1.3, the threshold value of the impurity B was 0.06, and the threshold value of the impurity C was 0.013. A graph of the threshold values is shown in FIG. 10B. FIG. 10C shows a state in which the graphs of the total sum are superposed on each other.

On the basis of the graphs, as shown in FIG. 11A, it could be determined that, although the threshold value of the impurity A was not completely equal to the threshold value of the unreaction ratio, the threshold values were related to each other. When the threshold value of the second unreaction ratio was changed from 0.039 to 0.04 to calculate a cumulative value, as shown in FIG. 11B, the graphs were exactly equal to each other. In this manner, it was found that the abnormality was probably caused by the impurity A in the first refining process.

According to the analysis as described above, in addition to the analysis of a cause, various pieces of information can be obtained. For example, as shown in FIG. 12, since the graphs about the impurity B and the impurity C are well similar to each other, the purifying mechanisms thereof are inferred to be the similar ones.

In the example, detected values of the product measuring means 60, the manufacturing condition 1 measuring means 71 to the manufacturing condition n measuring means 7n are automatically input to the measured value storing device 10. However, the measured values read by the various measuring means may be manually input to the measured value storing device 10. In this manner, when data is to manually input to the measured value storing device 10, data cleaning such as correction of an input error is required.

[Reference Numerals]
10: measured value storing device
11: product threshold value setting means
12: product comparing means
13: product abnormality accumulating means
14: product threshold value changing means
15: product abnormality accumulation graph creating means
21: condition threshold setting means
22: condition comparing means
23: condition abnormality accumulating means
24: condition threshold value changing means
25: condition abnormality accumulation graph creating means
30: cause identifying means
40: identifying system
50: plant
71: manufacturing condition 1 measuring means
72: manufacturing condition 2 measuring means
7n: manufacturing condition n measuring means

The invention claimed is:

1. A system for identifying causes of an abnormality appearing in one of data of products produced in plants and/or data of manufacturing conditions of one or more of the plants, the system comprising:

a data storing device in which the data of products and/or the data of manufacturing conditions are acquired for a predetermined set period;

means that set one or more product threshold values for the products for the predetermined set period;

means that compares the data of the products with the one or more product threshold values;

means that accumulate a number of times that the data of the products falls within a reference range determined by the one or more product threshold values to acquire a trend and/or a frequency related to an abnormality of the products;

means that set one or more manufacturing condition threshold values for the manufacturing conditions for the predetermined set period;

means that compares the data of the manufacturing conditions with the one or more manufacturing condition threshold values;

means that accumulate a number of times that the data of the manufacturing conditions falls within a reference range determined by the one or more manufacturing conditions threshold values to acquire a trend and/or a frequency related to an abnormality of the manufacturing conditions; and means that compares the trend and/or the frequency related to the abnormality of the products with the trend and/or the frequency related to the abnormality of the manufacturing conditions to identify the cause of the abnormality appearing in the products produced in the plants and/or the manufacturing conditions of the one or more of the plants.

2. The system for identifying the causes of the abnormality according to claim 1, further comprising:

means that changes the one or more product threshold values to correspond to a product abnormality cumulative frequency, which is a predetermined percentage determined in advance with respect to a total number of measured data points; and means that changes the one or more manufacturing condition threshold values to correspond to a manufacturing condition cumulative frequency, which is a predetermined percentage with respect to a number of measured data points.

3. The system for identifying the causes of the abnormality according to claim 1, further comprising:

means that creates first graphs to show the trend and/or the frequency related to the abnormality of the products;

means that creates second graphs to show the trend and/or the frequency related to the abnormality of the manufacturing conditions; and means that identifies the causes of the abnormality of the products and/or the manufacturing conditions of the one of the plants, based on a similarity of timing of sudden changes between the first and second graphs.

4. The system for identifying the causes of the abnormality according to claim 1, further comprising data acquisition means of raw materials, products and manufacturing conditions for acquiring data related to the plants and/or analytical equipment.

5. The system for identifying the causes of the abnormality according to claim 1, wherein the data in the storing device include previously and presently measured values.

6. A method for identifying causes of an abnormality appearing in one of data of products produced in plants and/or data of manufacturing conditions of one or more of the plants, wherein each of the data of the products and the data of the manufacturing conditions are stored in a storing device, the method comprising:

setting one or more product threshold values for the products for a predetermined set period;

comparing the data of the products with the one or more product threshold values;

accumulating a number of times that the data of the product falls within a reference range determined by the one or more product threshold values to acquire a trend and/or a frequency related to an abnormality of the products;

setting one or more manufacturing condition threshold values for the manufacturing conditions for the predetermined set period;

comparing the data of the manufacturing conditions with the one or more manufacturing condition threshold values;

accumulating a number of times that the data of the manufacturing conditions falls within a reference range determined by the one or more manufacturing condition threshold values to acquire a trend and/or a frequency related to an abnormality of the manufacturing conditions; and comparing the trend and/or the frequency related to the abnormality of the products with the trend and/or the frequency related to the abnormality of the manufacturing conditions to identify the cause of the abnormality appearing in the products produced in the plants and/or the manufacturing conditions of the one or more of the plants.

7. The method for identifying the causes of the abnormality according to claim 6, further comprising:

changing the one or more product threshold values to correspond to product abnormality cumulative frequency, which is a predetermined percentage determined in advance with respect to a total number of measured data points; and changing the one or more manufacturing condition threshold values to correspond to a manufacturing condition cumulative frequency, which is a predetermined percentage with respect to a number of measured data points.

8. The method for identifying the causes of the abnormality according to claim 6, further comprising:

creating first graphs to show the trend and/or the frequency related to the abnormality of the products;

creating second graphs to show the trend and/or the frequency related to the abnormality of the manufacturing conditions; and identifying the causes of the abnormality of the products and/or the manufacturing conditions of the one of the plants, based on a similarity of timing of sudden changes between the first and second graphs.

9. The method for identifying the causes of the abnormality according to claim 6, further comprising:

acquiring data related to the plants and/or analytical equipment.

10. The method for identifying the causes of the abnormality according to claim 6, wherein the data in the storing device include previously and presently measured values.

11. A non-transitory computer-readable medium storing a computer program for identifying the causes of an abnormality appearing in one of data of products produced in plants and/or data of manufacturing conditions of one or more of the plants, wherein each of the data of the products and the data of the manufacturing conditions are stored in a storing device, the computer program comprising instructions that when executed by a processor performs the following processes:

setting one or more product threshold values for the products for a predetermined set period;

comparing the data of the products with the one or more product threshold values;

accumulating a number of times that the data of the product falls within a reference range determined by the one or more product threshold values to acquire a trend and/or a frequency related to an abnormality of the products;

setting one or more manufacturing condition threshold values for the manufacturing conditions for the predetermined set period;

comparing the data of the manufacturing conditions with the one or more manufacturing condition threshold values;

accumulating a number of times that the data of the manufacturing conditions falls within a reference range determined by the one or more manufacturing condition threshold values to acquire a trend and/or a frequency related to an abnormality of the manufacturing conditions; and comparing the trend and/or the frequency related to the abnormality of the products with the trend and/or the frequency related to the abnormality of the manufacturing conditions to identify the cause of the abnormality appearing in the products produced in the plants and/or the manufacturing conditions of the one or more of the plants.

12. The non-transitory computer readable medium for identifying the causes of the abnormality according to claim 11, the computer program further comprising instructions that when executed by the processor performs the following processes:

changing the one or more product threshold values to correspond to product abnormality cumulative frequency, which is a predetermined percentage determined in advance with respect to a total number of measured data points; and changing the one or more manufacturing condition threshold values to correspond to a manufacturing condition cumulative frequency, which is a predetermined percentage with respect to a number of measured data points.

13. The non-transitory computer readable medium for identifying the causes of the abnormality according to claim 11, the computer program further comprising instructions that when executed by the processor performs the following processes:

creating first graphs to show the trend and/or the frequency related to the abnormality of the products;

creating second graphs to show the trend and/or the frequency related to the abnormality of the manufacturing conditions; and identifying the causes of the abnormality of the products and/or the manufacturing conditions of the one of the plants, based on a similarity of timing of sudden changes between the first and second graphs.

14. The non-transitory computer readable medium for identifying the causes of the abnormality according to claim 11, the computer program further comprising instructions that when executed by the processor performs the following process:

acquiring data related to the plants and/or analytical equipment.

15. The non-transitory computer readable medium for identifying the causes of the abnormality according to claim

11, wherein the data in the storing device include previously and presently measured values.

\* \* \* \* \*